United States Patent Office 2,700,623
Patented Jan. 25, 1955

2,700,623

PROCESS OF BONDING SOLID LUBRICANT TO A METAL SURFACE

Ralph D. Hall, Woodland Hills, Calif., assignor to Electrofilm, Inc., North Hollywood, Calif., a corporation of California No Drawing. Application April 26, 1950, Serial No. 158,335

5 Claims. (Cl. 117—71)

This invention relates to processes for bonding or fusing graphite to surfaces and to the articles obtained thereby. This application is a continuation-in-part of my application Serial No. 662,099, filed April 13, 1946, and now abandoned.

Graphite has been known for many years to be one of the most successful dry lubricants ever discovered, and has been used alone for this purpose and also as an ingredient of lubricating compositions. However, dry graphite as ordinarily used, adheres to a friction surface for only a limited time and frequently requires replacement.

In accordance with my invention, graphite may be practically permanently bonded to or fused into or onto the surface of the article being treated, and thus provide lubrication or protection for very long periods of time without any further treatment.

One object of my invention is to provide processes for fusing or bonding graphite to the surfaces of articles whereby the graphite is retained at least semi-permanently in a position to produce lubrication.

Another object of this invention is the production of articles with surfaces having substantial quantities of finely divided particles of graphite embedded, impregnated or diffused therein as distinguished from a mere coating of loose graphite particles.

A further object of this invention is to provide friction surfaces on articles with lubrication in the form of particles of graphite bonded and held securely thereto by means of a resinous bonding agent that is resistant to heat and pressure and that does not deteriorate in the presence of oils and other lubricants.

Another object of this invention is to provide a lubricating coating on friction surfaces of various articles, such coating comprising low melting point metal or alloy with particles embedded or fused therein.

Other objects and advantages of the invention will be described and will be apparent from the following description of several embodiments of my invention.

In general, the application of graphite as a lubricant in accordance with my invention involves the steps of preparing the article surface or surfaces for coating, applying thereto finely divided graphite and one or more bonding agents, and completing the process of fixing the material in place, usually by means of a curing or baking treatment. The exact procedure to be followed will vary considerably depending upon the types of surfaces to be treated and the usage to which the coated surface is to be subjected.

For example, certain friction surfaces such as those composed of ordinary iron or steel may be prepared by either ordinary sandblasting or a phosphate type of coating treatment forming crystalline iron phosphates on the surface and well known commercially under the names "Parkerizing," "Bonderizing" or "Lubrizing." The surface obtained by the latter treatment is more resistant to corrosion than the plain iron or steel surface and receives readily a coating of finely divided graphite in a resinous vehicle. A suspension of the finely divided graphite in a resinous vehicle may be applied to the prepared surface in any suitable manner as by spraying, dipping, brushing or the like, and the coated surface is then heated or baked to cure the resinous material and form the desired bond. The graphite thus becomes embedded in and firmly bonded to the crystalline steel or iron surface.

In the case of other metal surfaces, such as surfaces of non-ferrous metals or alloys or of austenitic or non-magnetic steels, the surfaces may be prepared by first applying a thin coating of a low melting point alloy or metal such as indium or gallium. This may be done by electroplating, hot dipping or in any other suitable manner. The metal coated surface may then be heated, if necessary, to obtain a diffused bond between the base metal and the coating metal. Heating at this stage, however, is usually not required. Graphite may then be applied to the coated surface, the graphite being suspended preferably in a suitable organic vehicle, and the graphite coated article is heated at a temperature preferably above the melting point of the coating metal, whereupon the graphite becomes firmly embedded in the low melting point coating metal and thus at least semi-permanently attached or bonded to the friction surface. Either indium or gallium alone may be used as the coating metal, or alloys of one or both of these metals that have a relatively low melting point below about 500° F., and preferably below 400° F. may be used.

An alternative and in many cases preferable procedure for applying this type of coating is to prepare a mixture of the graphite and low melting point coating metal, each being in powdered form and preferably suspended in a suitable organic carrier. This suspension may be applied direct to the friction surface, with or without a preliminary preparation of the surface, and the coated surface is then heated to effect the bond between the coating metal, graphite and the surface being treated. Such a treatment as this may be applied to all kinds of bearing metal and other metal surfaces and also to surfaces other than metal surfaces, such as certain types of relatively porous ceramic surfaces, and in some instances to the surface of synthetic plastics capable of standing the temperature used for baking. Ceramic and some plastic surfaces may also be coated with colloidal or finely divided metal such as iron or copper which is baked or fused in place to provide a surface on which indium or similar low melting metal can be applied and the graphite can then be fused into the indium as described above.

A particularly satisfactory coating procedure for surfaces of bearings or the like made of various bronzes, bearing alloys, stainless steel, chromium, nickel, etc. is the following. A flash coating or thin plate of indium is first put on the surface, and then a suspension of powdered graphite and powdered metal in a resinous solution is applied on top of the indium by spraying, dipping, brushing or the like and baked. The preliminary coat of indium may be omitted in some cases.

The solid ingredients in this suspension may consist of a mixture of finely divided graphite with one or more relatively soft powdered metals having a low melting point. Powdered indium and silver, either singly or mixed together are very effective, and other powdered metals such as lead, tin and zinc may also be employed. At least about 40% of the solid ingredients in this mixture should be graphite and if powdered metal is employed at all it is desirable to use at least about 10% of it. The graphite and powdered metal or metals in the desired proportions are preferably thoroughly mixed together and then ground or milled as in a ball mill with a solution of resinous material. For most applications about 4 to 8 parts by weight of resin solution mixed with 1 part of graphite-powdered metal mixture are satisfactory.

It is generally not desirable to apply indium or gallium coatings directly to plain iron or steel surfaces because it is apt to promote corrosion. However, plain iron or steel surfaces may be coated in this manner after first giving them a flash coating of a non-ferrous metal such as copper, nickel, chromium, cadmium, zinc or the like. The coated iron or steel surface is then treated by one of the methods of applying graphite described above.

In the case of non-ferrous metal surfaces, particularly electroplated surfaces, the electrodeposited metal such as chromium, nickel or the like is preferably made somewhat porous by suitable control of the bath and current density used as will be readily understood by those skilled in the art of electroplating. A double coating of indium or similar low melting point metal has certain advantages in this case although it is not essential. For example, the plated object may first be given a very thin coat of indium which is baked at a relatively high temperature such as 350–900° F. from one to four hours to drive the indium into the surface. This also serves the purpose of removing occluded hydrogen and otherwise stabilizing the surface for further treatment. A second thin coating of the indium may then be applied, then coated with the suspension of graphite alone or with powdered metal in a resin solution and finally baked again to fix or fuse the graphite in place. This second baking may be at a lower temperature or for a shorter time, or both, 30 to 60 minutes at about 350° F. generally being satisfactory.

The vehicle used for any of these coatings may be in liquid or paste form but should be carefully selected in order to obtain satisfactory results. In the case of direct application of graphite to a phosphated iron or steel surface, or a surface which does not include a low melting point metal, the vehicle should contain a thermo-setting bonding agent capable of forming a strong bond that does not deteriorate under the influence of heat and pressure, that is resistant to the action of oils, lubricants, gasoline and the like, and that will not become brittle in use. Such a vehicle should also be capable of holding the graphite properly in suspension and not permitting it to settle out before or after the coating is applied.

In case indium, gallium or another low melting point metal or alloy is to be used to bond the graphite to the friction surface, the vehicle requirements are somewhat different. The vehicle in this case should also be capable of holding the graphite in suspension, and in addition should hold the graphite in place during subsequent heating until the graphite is embedded in the metal. It should also form a crust to hold the molten metal in place during baking and should not leave a residue after heating that is abrasive or otherwise objectionable.

One material that has been found particularly suitable as a vehicle for both types of coatings is a preparation of the copolymers of vinyl chloride and vinyl acetate mixed with a thermo-setting resinous material, such as a "B" stage phenol formaldehyde resin. Other organic resins which may be used as the sole bonding agent or may be used to hold the graphite in place until it can be fused or embedded in a layer of low melting metal or alloy are the silicone resins, alkyd resins and other vinyl resins. The choice of bonding agent will depend not only on the manner of bonding the graphite but also on the use to which the graphitized surface is to be put and the nature of the surface that is coated. For example, even a solution of a synthetic rubber such as Thiokol, Neoprene or Buna-N can be used as the bonding agent when the graphite is applied to a flexible surface such as the surface of rubber or journal packing.

The use of a resinous bonding agent having a thermo-setting property is particularly desirable when it is to serve as the ultimate bonding agent for the graphite, but is not essential when the graphite is to be held ultimately by a low melting point metal such as indium or gallium.

Any of the customary solvents may be used to dilute or thin the resin solution. Although my invention is not limited thereto, methyl ethyl ketone, methyl isobutyl ketone, acetone, ethylene dichloride and toluene are examples of suitable solvents that may be used as thinners.

Graphite in various forms may be used, although I prefer to use a natural flake graphite comminuted so that the majority of the particles do not exceed about 10 microns in size. The particular size of the particles, however, is not critical. The graphite is preferably used dry, in powder form, and may be incorporated with the vehicle by a simple agitation, by milling, by grinding or in any other manner to produce a uniform suspension. The following specific examples of coating operations are given by way of illustration, but should not be taken as limiting the inventions to the details thereof.

Example 1.—The friction surfaces of an ordinary carbon steel shaft are cleaned and then coated by the commercial method known as "Lubrizing" in which the surfaces are subjected to the action of an acid solution of metal phosphates. The phosphate treated surfaces thus obtained are somewhat rough and have a crystalline appearance due to the formation of iron phosphates thereon. The surfaces are then further treated by spraying on them a suspension of very finely divided graphite in a resinous vehicle sold under the tradename of "Cordo 350." This resin is a mixture of different types of copolymers of a vinyl acetate and vinyl chloride with a somewhat smaller amount of "B" stage phenol-formaldehyde resin incorporated therein along with the usual plasticizer and solvent. In preparing the suspension of graphite, thinning solvent such as one of the usual hydrocarbons, ketones or the like may be added to the resin to obtain a liquid containing about 1–10% solids. The graphite may be added thereto in varying quantities from ¾ of a pound up to 3½ lbs. or more per gallon. For most purposes, one to two pounds of graphite per gallon is satisfactory, although this may be varied depending upon the final consistency of the suspension that is desired. This resin suspension is then sprayed on the phosphated surface, allowed to air dry and then baked, preferably at a temperature of 350° F. for 30 minutes. The graphitized surface thus obtained is thoroughly covered with minute particles of graphite firmly bonded to the metal.

Example 2.—The friction surfaces of a bronze bearing are cleaned and then electroplated with indium until a coating about 5 ten-thousandths of an inch thick is obtained. A suspension of finely divided graphite in a resinous vehicle, which may be prepared as described in Example 1, is then applied by spraying or brushing on the indium surface, is allowed to air dry and is then baked at a temperature of the order of 350° F. for a period of thirty minutes and allowed to cool. In this case, the coating metal is melted and the graphite is fused or embedded in the surface of the bearing to a considerable depth to provide more or less permanent lubrication.

Example 3.—A valve and its stem of steel is plated with a relatively porous coating of chromium about 3 to 5 ten thousandths of an inch thick and is then plated with a layer of indium of about the same or less thickness. The plated valve is then heated at a temperature of about 750° F. for one hour to diffuse the indium into the surface and remove hydrogen. Too thick a coating of indium should not be used on plated surfaces because of the possibility of producing a rough or cratered surface when heated. After removal from the oven, the valve is plated with a second thin coating of indium and then sprayed with a thin coat of a resinous suspension of graphite prepared as described in Example 1. The valve is finally baked at 350° F. for 45 minutes to complete the operation and fuse the graphite in place. Such a coated valve has more or less permanently lubricated surfaces resistant to heat and lubricants and is not changed materially from its original size.

Example 4.—The surface of a bronze bearing was given a flash coat or thin plate of indium. This indium surface was then spray coated with a previously prepared mixture of powdered metals, graphite and resin. This mixture was made by mixing together 1 part powdered indium, 1 part powdered silver and 2 parts finely divided graphite, by weight. This mixture of solids was then added to three times its weight of a thin vinyl resin solution sold under the name "Plycozite 117" and the whole mix was ball milled for about 24 hours. The indium surface on the bearing coated with this mix was then baked at a temperature of about 400° F. for 45 minutes to form a fused bearing surface containing embedded particles of graphite.

Example 5.—A suitably prepared surface of a bearing was coated with a thin layer of the following mixture:

| | Parts by weight |
|---|---|
| Silicone varnish | 60 |
| Graphite powder | 10 |
| Powdered silver | 5 |
| Silicone oil | 3 |
| Solvent | 22 |

This mixture was milled together until the particles of graphite and silver were −400 mesh and was then sprayed on the prepared bearing surface. The bearing thus coated was finally baked at a temperature of 500° F. for two hours.

While I prefer for most purposes to use graphite as the lubricating constituent in all of these compounds, other materials may be substituted for part of the graphite for certain applications. For example, if the graphitized surface is to have frictional contact with rubber, some of the graphite may be replaced with powdered mica or vermiculite. Also, for coating leaf springs, high temperature bearings or equipment subjected to intense oxidation, up to 50% of the powdered graphite in the coating may be replaced with powdered molybdenum disulfide.

In extreme cases, and particularly for articles such as the threads of stainless steel or aluminum bolts and nuts, various coil springs and the like, up to 90% of the powdered graphite may be replaced by molybdenum disulfide.

It will be apparent from the foregoing that my invention is applicable to a great many different kinds of surfaces, including not only such articles as the surfaces of gears, bearings, shafts and the like, but also to the friction surfaces of electrical switches, clutch and brake discs, doors and various other types of friction surfaces where lubrication is desired for easier operation or for better heat dissipation and longer life. In addition, it may be advantageous to apply my coatings to other surfaces than friction surfaces. For example, the operation and useful life of electrodes such as used in spark plugs may be enhanced by application of a coating of graphite applied in accordance with my invention. Coatings applied in accordance with my invention may be made very thin so that the total thickness is only one thousandths of an inch or less, thus being satisfactory even though the tolerances permitted for the part being treated are very small. Thicker coatings, may, of course, be applied if desired.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

Dry film lubrication of irregular surface elements by methods employing finely divided flaky solid lubricant particles and resinous binders, are more particularly dealt with in my copending application Serial No. 425,751 entitled "Dry Lubrication Process and Product," filed April 21, 1954.

I claim:

1. A process for bonding graphite to a surface coated with a layer of low melting point metal which comprises applying thereto a coating of finely divided graphite suspended in a vehicle capable of holding the graphite in place during melting of said metal, and heating the coated surface sufficiently to melt said low melting point metal and embed the graphite therein, said suspension containing at least about ¾ lb. of graphite per gallon of vehicle and the vehicle comprising a solution of a polymerizable thermosetting resin in an organic solvent.

2. A process for bonding graphite to a metal friction surface which comprises applying to such surface a thin coating of a low melting metal selected from the class consisting of indium, gallium and alloys of indium and gallium having a melting point below about 500° F., heating said coating to obtain a diffused bond to said surface, applying thereto a coating of graphite suspended in a solution of a thermosetting resin in an organic solvent, and heating the coated surface to embed the graphite in said coating metal.

3. A process for bonding solid lubricant to a metal friction surface which comprises applying to such surface a thin coating of a low melting metal selected from the class consisting of indium, gallium and alloys of indium and gallium having a melting point below about 400° F., heating said coating to obtain a diffused bond to said surface, applying thereto a coating of solid lubricant suspended in a solution of a vinyl resin, and heating the coated surface above the melting point of the coating metal.

4. A process for bonding solid lubricant to a nonferrous metal friction surface which comprises applying thereto a thin coating of indium or an alloy thereof, heating said surface to bond said coating thereto by diffusion, applying to said coated surface finely divided solid lubricant suspended in an organic vehicle comprising a solution of an organic resin, allowing said second coating to air dry, and heating the coated surface to a temperature above the melting point of the coating metal to embed solid lubricant therein.

5. A process as defined in claim 4 in which the organic vehicle is a resin solution containing about 1 to 10% solids and in which the suspension contains about ¾ to 3½ lbs. of solid lubricant per gallon of resin solution.

References Cited in the file of this patent

UNITED STATES PATENTS

| Number | Name | Date |
|---|---|---|
| 1,054,265 | Blaekeland | Feb. 25, 1913 |
| 1,603,086 | McKee | Oct. 12, 1926 |
| 2,010,133 | Bloomenthal | Aug. 6, 1935 |
| 2,068,113 | Schellenger et al. | Jan. 19, 1937 |
| 2,085,413 | Bloomenthal | June 29, 1937 |
| 2,187,086 | Koehring | Jan. 16, 1940 |
| 2,241,789 | Queneau et al. | May 13, 1941 |
| 2,270,662 | Raney | Jan. 20, 1942 |
| 2,335,958 | Parker | Dec. 7, 1943 |
| 2,353,951 | Wood et al. | July 18, 1944 |
| 2,408,430 | Lowey et al. | Oct. 1, 1946 |
| 2,433,062 | Pfeffer et al. | Dec. 23, 1947 |
| 2,465,329 | Murray | Mar. 22, 1949 |
| 2,466,642 | Larsen | Apr. 5, 1949 |
| 2,495,199 | Podolsky | Jan. 17, 1950 |